(12) United States Patent
Or et al.

(10) Patent No.: US 8,000,557 B2
(45) Date of Patent: Aug. 16, 2011

(54) METHOD FOR GENERATING AN IMAGE AND AN IMAGE GENERATOR

(75) Inventors: Etay Mar Or, Nahariva (IL); Dmitry Pundik, Ramat Gan (IL); Chen Bankirer, Ramat Gan (IL)

(73) Assignee: Advasense Technologies Ltd., Rananna (IL)

( * ) Notice: Subject to any disclaimer, the term of this patent is extended or adjusted under 35 U.S.C. 154(b) by 1155 days.

(21) Appl. No.: 11/610,301

(22) Filed: Dec. 13, 2006

(65) Prior Publication Data
US 2008/0144933 A1 Jun. 19, 2008

(51) Int. Cl.
*G06K 9/36* (2006.01)
*G06K 9/20* (2006.01)
*G06K 9/62* (2006.01)

(52) U.S. Cl. .......................... 382/276; 382/312; 396/215

(58) Field of Classification Search .................. 382/173, 382/276, 278, 312; 396/155, 207, 213, 212, 396/215
See application file for complete search history.

(56) References Cited

U.S. PATENT DOCUMENTS

| 7,468,743 | B2 * | 12/2008 | Washisu ..................... 348/208.1 |
| 2006/0109373 | A1 * | 5/2006 | Kurane ......................... 348/362 |
| 2007/0126866 | A1 * | 6/2007 | Uchida ........................... 348/79 |
| 2007/0139548 | A1 * | 6/2007 | Sugimoto et al. ............. 348/371 |
| 2008/0088691 | A1 * | 4/2008 | Fitzpatrick et al. .......... 347/116 |

* cited by examiner

*Primary Examiner* — Kanji Patel
(74) *Attorney, Agent, or Firm* — Reches Patents

(57) ABSTRACT

An image is generated by receiving a first image that is acquired during a first exposure period and defining the first image as a reference image; defining multiple reference regions of interest within the reference image, wherein an aggregate number of pixels within the multiple reference regions of interest is substantially smaller than a number of pixels of the first image; receiving a second image that is acquired during a second exposure period; and updating the reference image in response to a content of the reference image, content of the second image and a first type of spatial relationship (e.g., a shift) defined between the reference image and the second image, wherein the shift is defined in response to multiple spatial relationships between the multiple reference regions of interest and between multiple regions of interest of the second image.

15 Claims, 7 Drawing Sheets

METHOD FOR GENERATING AN IMAGE AND AN IMAGE GENERATOR

FIELD OF THE INVENTION

The invention is directed to methods for generating an image and an image generator.

BACKGROUND OF THE INVENTION

Digital cameras can generate images by exposing an array of light sensitive elements (also referred to as sensors) to light. Due to the finite sensitivity of these light sensitive elements, various light conditions may require long exposure periods. During these long exposure periods the camera can shake, thus blurring the image.

During the last decade various methods and devices were developed in order to enhance the quality of images acquired by digital cameras. Some of these methods and device are illustrated in the following patents and patent applications, all of which are incorporated herein by reference: U.S. Pat. No. 7,092,019 of Ogata, U.S. patent application publication 2006/114331 of Tamamura, U.S. patent application publication 2006/140507 of Ohki and U.S. patent application publication 2006/170784 of Clarke et al.

There is a need to provide an effective method for generating an image and an effective image generator.

SUMMARY OF THE INVENTION

A method for generating an image includes: receiving a first image that is acquired during a first exposure period and defining the first image as a reference image; defining multiple reference regions of interest within the reference image, wherein an aggregate number of pixels within the multiple reference regions of interest is substantially smaller than a number of pixels of the first image; receiving a second image that is acquired during a second exposure period; and updating the reference image in response to content of the reference image, content of the second image and a first type of spatial relationship (e.g., a shift) defined between the reference image and the second image, wherein the shift is defined in response to multiple spatial relationships between the multiple reference regions of interest and between multiple regions of interest of the second image.

An image generator includes: a memory for storing a second image that is acquired during a second exposure period and a reference image; and an image processor adapted to: define a first image as the reference image, the first image having been acquired during a first exposure period that precedes the second exposure period; define multiple reference regions of interest within the reference image, wherein an aggregate number of pixels within the multiple reference regions of interest is substantially smaller than a number of pixels of the first image; and update the reference image in response to content of the reference image, content of the second image and a first type of spatial relationship (e.g., a shift) defined between the reference image and the second image, wherein the shift is defined in response to multiple spatial relationships between the multiple reference regions of interest and between multiple regions of interest of the second image.

A computer program product of a computer readable medium usable with a programmable computer, the computer program product having computer-readable code embodied therein for generating an image, the computer-readable code comprising instructions for: receiving a first image that is acquired during a first exposure period and defining the first image as a reference image; defining multiple reference regions of interest within the reference image, wherein an aggregate number of pixels within the multiple reference regions of interest is substantially smaller than a number of pixels of the first image; receiving a second image that is acquired during a second exposure period; and updating the reference image in response to content of the reference image, content of the second image and a first type of spatial relationship (e.g., a shift) defined between the reference image and the second image, wherein the shift is defined in response to multiple spatial relationships between the multiple reference regions of interest and between multiple regions of interest of the second image.

BRIEF DESCRIPTION OF THE DRAWINGS

The present invention will be understood and appreciated more fully from the following detailed description taken in conjunction with the drawings in which.

DETAILED DESCRIPTION

Reference will now be made in detail to specific embodiments of the invention. Examples of such embodiments are illustrated in the accompanying drawings. While the invention will be described in conjunction with these illustrated examples, it will be understood that it is not intended to limit the invention to one embodiment.

In the following description, numerous specific details are set forth in order to provide a thorough understanding of the present invention. The present invention may be practiced without some or all of these specific details. In other instances, well known methods and operations have not been described in detail in order not to unnecessarily obscure the present invention.

It is noted that although the mentioned below explanation refer to still images that the invention can be applied to video streams. It is further notes that the spatial shift between consecutive images can be provided to a video encoder and can assist in encoding a video stream.

Figure 1:
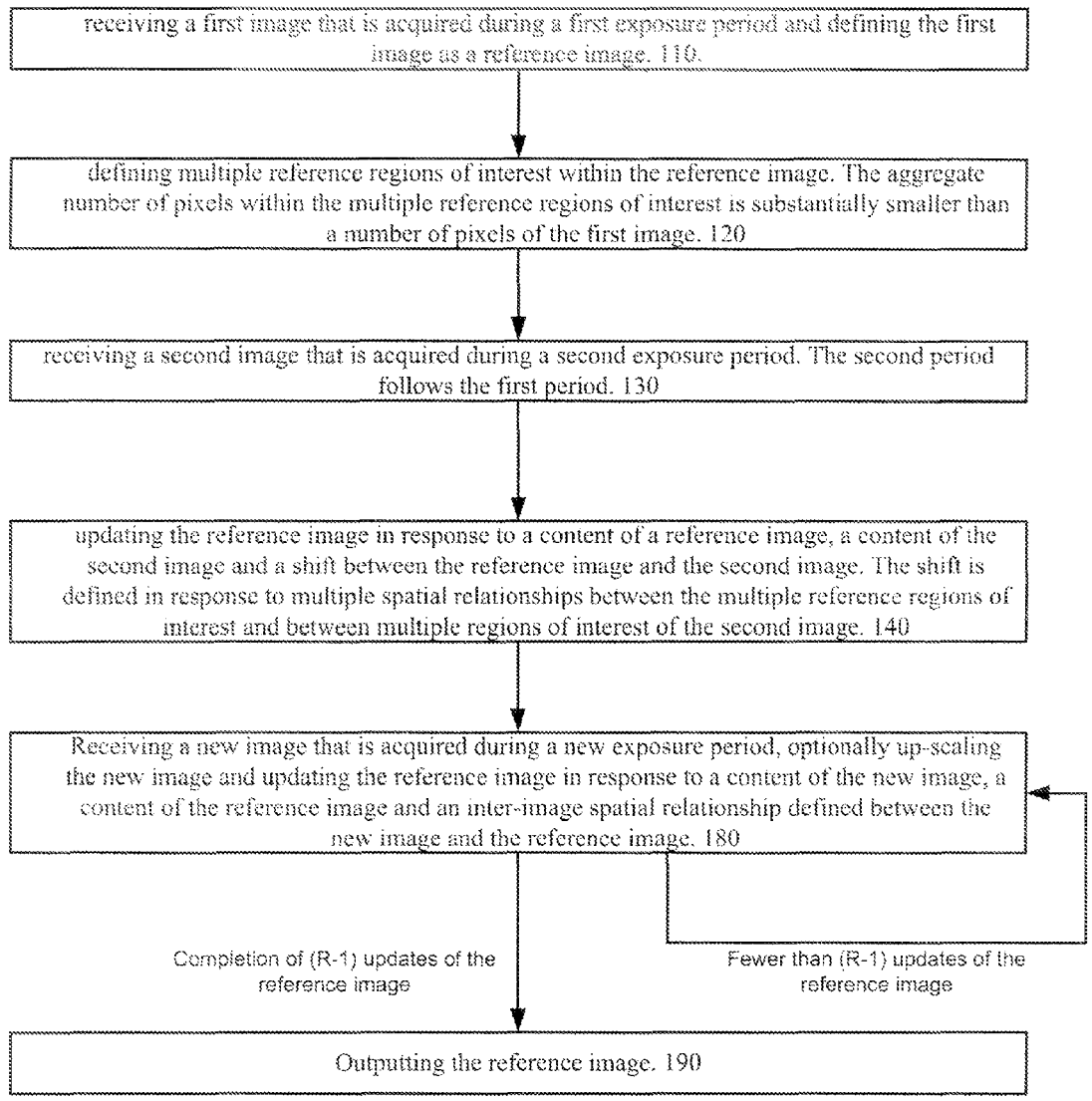
FIG. 1 illustrates a method for generating an image according to an embodiment of the invention.

Referring now to FIG. 1, a method 100 for generating an image, according to an embodiment of the invention, is illustrated. Method 100 starts by stage 110 of receiving a first image that is acquired during a first exposure period and defining the first image as a reference image. The first image is conveniently generated by an array of sensors.

Stage 110 is followed by stage 120 of defining multiple reference regions of interest within the reference image. The aggregate number of pixels within the multiple reference regions of interest is substantially smaller than a number of pixels of the first image. According to an embodiment of the invention the multiple regions of interest are non-overlapping.

Stage 120 is followed by stage 130 of receiving a second image that is acquired during a second exposure period. The second period follows the first period. Conveniently, the length of the second period equals the length of the first period but this is not necessarily so.

Stage 130 is followed by stage 140 of updating the reference image in response to content of the reference image, content of the second image and a shift between the reference image and the second image. The shift is defined in response to multiple spatial relationships between the multiple reference regions of interest and between multiple regions of interest of the second image. Stage 140 can include up-scaling the second image. The up-scaling can be executed on the fly and in various manners such as row or column cloning, interpolations and the like.

According to yet another embodiment of the invention only the search windows (and not the whole new image) are up-scaled. Once the regions of interest are found the reference image can be updated by an up-scaled image.

It is assumed that R images should be processed in order to provide an output image. If R=2 then method 100 ends and stage 140 is followed by stage 190 of outputting the reference image. During stage 190 the reference image is provided as the output image. For simplicity of explanation this path (from stage 140 directly to stage 190) is not illustrated.

Assuming that R>2 then stage 140 is followed by stage 180 that is repeated (R-2) times—until R acquired images are processed and the reference image is updated (R-1) times. This repetition is represented by an arrow that stretched from stage 180 to itself.

Stage 180 includes receiving a new image that is acquired during a new exposure period and updating the reference image in response to content of the new image, content of the reference image and a shift between the new image and the reference image.

After the R images are processed, stage 180 proceeds to stage 190 of outputting an image. This outputted image is the updated reference image. It is noted that stage 190 may include displaying the outputted image on a display, storing it in a memory unit, transmitted it to another device, and the like.

Figure 2:
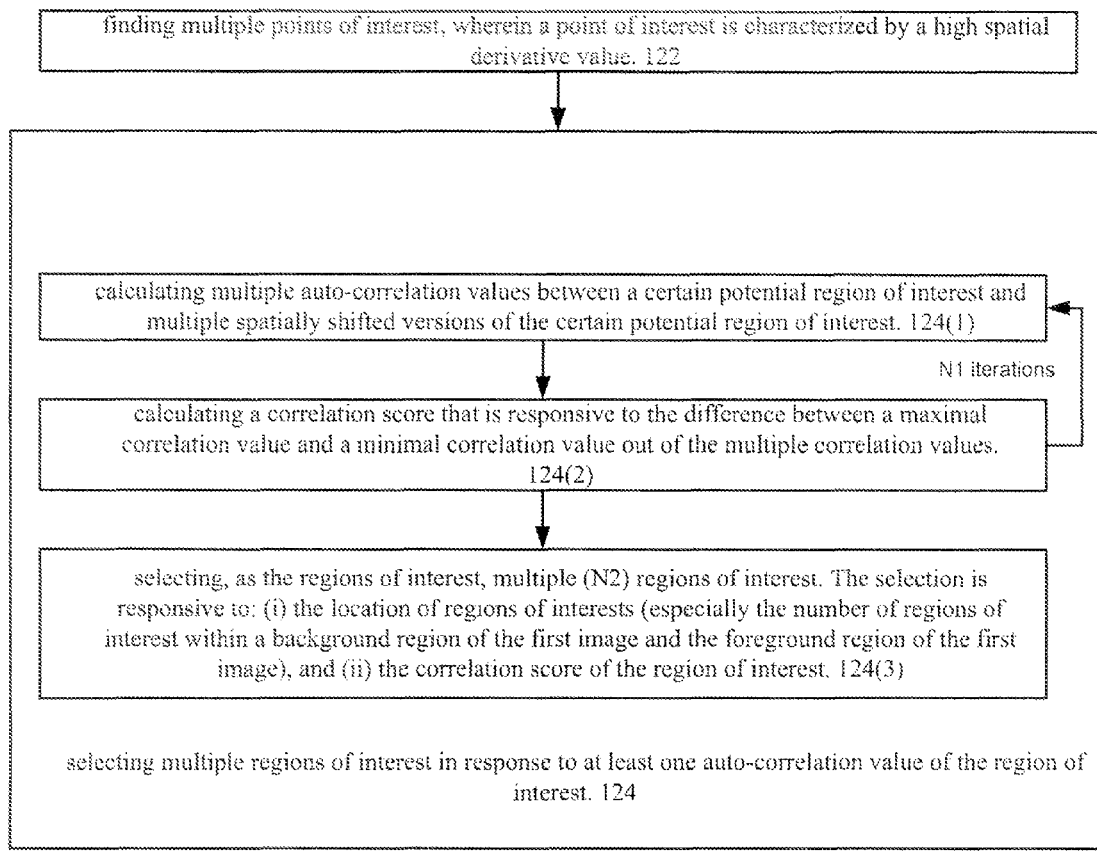
FIG. 2 illustrates a stage of defining multiple reference regions of interest within a reference image, according to an embodiment of the invention.

FIG. 2 illustrates in greater detail stage 120 of defining multiple reference regions of interest within the reference image, according to an embodiment of the invention. Stage 120 starts with stage 122 of finding multiple points of interest, wherein a point (pixel) of interest is characterized by a high spatial derivative value. The inventors ignored points of interest that were proximate to each other. It is assumed that up to N1 points of interest can be defined.

Conveniently, stage 122 includes finding multiple points of interest within a portion of the first image, while ignoring edge portions of the first image. The inventors received a first image of about 3 Mega-pixels and ignored pixels that were closer than 128 pixels from any edge of the first image.

According to an embodiment of the invention stage 122 includes calculating a derivative of a group of points out of the first image. These group of points can be positioned in fixed distances from each other, but this is not necessarily so. Thus, instead of examining each pixel of the image only selected pixels (for example—each fourth pixel) are examined.

According to an embodiment of the invention the distance between evaluated points is responsive to their spatial derivative value. Thus, the distance between a currently evaluated point and the next point depends upon the value of the derivative of the currently evaluated point or by whether the derivative is above or below a threshold. Conveniently, stage 122 includes finding points that had high x-axis derivative, and finding points that had high y-axis derivative. Further, stage 122 includes calculating the derivative of a point by applying a low pass filter matrix (H) as well as a gradient matrix ($D_x$) on spaced apart points (pixels) of the first image. The overall x-axis filter matrix (Gradient_filter_x) equals $H \times D_x$. The overall y-axis filter (Gradient_filter_y) equaled the $(H \times D_x)^T$. The inventors used the following low pass filter and gradient matrices, but other matrices can be applied. The low pass filter matrix is denoted H and the gradient matrix is denoted $D_x$.

$$H = \begin{pmatrix} 1 & 1 & 1 \\ 1 & 1 & 1 \\ 1 & 1 & 1 \end{pmatrix}$$

$$D_X = \begin{pmatrix} -2 & -1 & 0 & 1 & 2 \\ -2 & -1 & 0 & 1 & 2 \\ -4 & -2 & 0 & 2 & 4 \\ -2 & -1 & 0 & 1 & 2 \\ -2 & -1 & 0 & 1 & 2 \end{pmatrix}$$

Stage 122 is followed by stage 124 of selecting multiple regions of interest. The selection is responsive to one or more one auto-correlation value of each region of interest. The difference between a maximum and minimum auto-correlation values of a region of interest can be provided as a score of the region of interest. This score as well as other parameters can be taken into account when N2 regions of interest are selected. It is assumed that up to N2 regions of interest can be defined. Conveniently, N2 is smaller than N1.

Stage 124 may include multiple (N1) repetitions of stages 124(1)-124(2). Stages 124(1)-124(2) are repeated for each potential region of interest (out of N1 potential regions of interest) that includes a point of interest. Stage 124(1) includes calculating multiple auto-correlation values between a certain potential region of interest and multiple spatially shifted versions of the certain potential region of interest. It is assumed that up to N3 auto-correlation values are calculated. It is noted that the spatially shifted versions can be shifted by a spatial shift that can be responsive to a Bayer pattern of the first image or can be irresponsive to the Bayer pattern.

Table 1 illustrates four columns ($S^{th}$ column through $(S+3)^{th}$ column) and four rows ($Q^{th}$ row through $(Q+3)^{th}$ row) of a well known Bayer pattern.

| Row | column | | | |
| --- | --- | --- | --- | --- |
| | S | S + 1 | S + 2 | S + 3 |
| Q + 3 | Red pixel | Green pixel | Red pixel | Green pixel |
| Q + 2 | Green pixel | Blue pixel | Green pixel | Blue pixel |
| Q + 1 | Red pixel | Green pixel | Red pixel | Green pixel |
| Q | Green pixel | Blue pixel | Green pixel | Blue pixel |

Spatial shifts that are responsive to the Bayer pattern can be even, so that red pixels are correlated to red pixels, green pixels are correlated to green pixels and blue pixels are correlated to blue pixels. For example, the inventors used regions of 30×30 pixels and calculated auto-correlation values between a region and eighty spatially shifted versions that were generated by shifting the region by multiple combinations of the following horizontal shifts (+8, +6, +4, +2, 0, −2, −4, −6, −8) and the following vertical shifts: (+8, +6, +4, +2, 0, −2, −4, −6, −8). It is noted that inventors ignored the (−2,0,2)×(−2,0,2) shift combinations. The outcome of stage 124(1) was N2 auto-correlation matrices, each including eighty elements.

According to an embodiment of the invention the calculation of the auto-correlation is preceded by applying a filter on the region. Conveniently, the filter is an averaging filter. The inventors used a 5×5 matrix that included only "1" valued element. According to another embodiment of the invention the filter provides a gray level image of the region.

Stage 124(1) is followed by stage 124(2) of calculating a correlation score that is responsive to the difference between a maximum correlation value and a minimum correlation value out of the multiple correlation values. Referring to the previous example, the correlation score of a region equaled the difference between the maximum auto-correlation value and the minimum auto-correlation value of each auto-correlation matrix.

After N1 repetitions of stages 124(1)-124(2) the method progresses to stage 124(3) of selecting, as the regions of interest, N2 regions of interest. The selection is responsive to: (i) the location of regions of interests, especially the number of regions of interest within a background region of the first image and the foreground region of the first image and/or the relative distance between different regions of interest; and (ii) the correlation score of the regions of interest. It is noted that stage 124(3) does not necessarily occur after N1 repetitions of stages 124(1) and 124(2) and that various sorting methods can be used for selecting the N2 regions of interest. For example, after each iteration of stage 124(1) and 124(2) the process can check if the newly evaluated potential region of interest is a better candidate than previously examined potential regions of interest.

Conveniently, regions of interest that have higher correlation score are selected, as long that a certain amount of regions of interest are located within the background portion of the first image and a certain amount of regions of interest are located within the foreground portion of the first image.

Yet according to another embodiment of the invention each region is represented by three different matrices, each including points of a single color. Three correlation scores (one per color) are then calculated and the selection of the regions of interest will respond to these three correlation scores.

Figure 3:
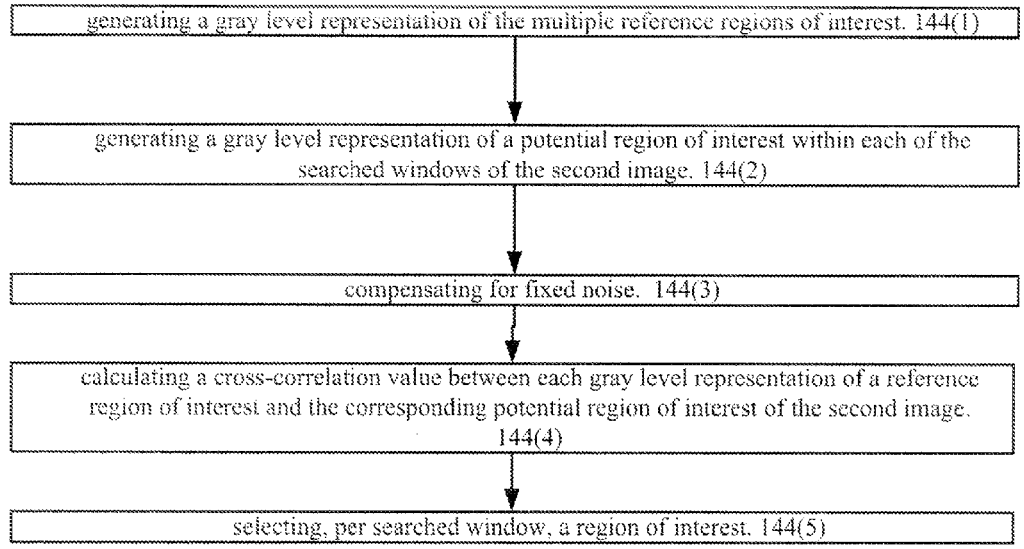
FIGS. 3 and 4 illustrate a stage of receiving a second image and updating the reference image, according to an embodiment of the invention.
Figure 4:
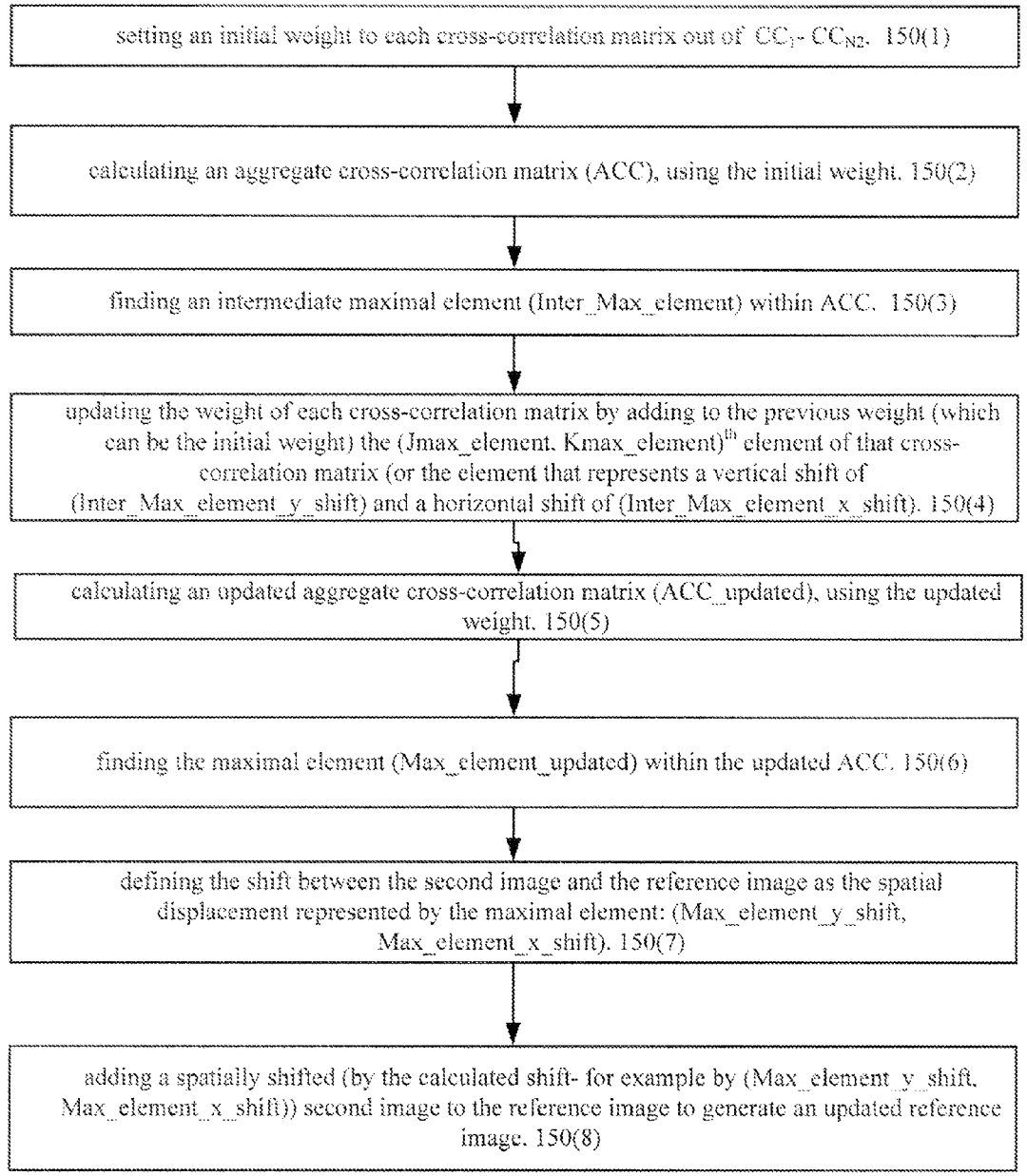

FIGS. 3 and 4 illustrate in further detail stage 140 of updating the reference image, according to an embodiment of the invention. FIG. 3 illustrates stage 144 of finding multiple regions of interest while FIG. 4 illustrates stage 150 of calculating multiple spatial relationships.

Stage 140 starts with stage 144 of finding multiple regions of interest within the second image. These regions of interest are located within well defined search windows. Stage 144 includes generating a cross correlation matrix for each region of interest within the second image.

Conveniently, stage 144 involves estimating (or receiving as input) a maximum allowed shift between the reference image and the second image. This estimation can be done in manners known in the art. The estimation is usually responsive to the time that lapsed between the current exposure period and the previous exposure period and to a maximum velocity of image elements within these images.

The maximum allowed spatial shift defines the search windows (within the second image) in which the finding process will take place. Each search window includes the (eventually detected) region of interest and its vicinity.

Conveniently, stage 144 starts by stage 144(1) of generating a gray level representation of the multiple reference regions of interest. Conveniently, stage 144(1) includes at least one of the following stages: (i) reconstructing all three colors per pixel, (ii) applying a bi-linear interpolation for calculating the missing color of each pixel, (iii) calculating a weighted average of the three color components per pixel, (iv) applying a low pass filter (represented by low pass filter matrix L1). An exemplary low pass filter matrix is represented below:

$$L1 = \frac{1}{32}\begin{pmatrix} 1 & 1 & 1 & 1 & 1 \\ 1 & 1 & 1 & 1 & 1 \\ 1 & 1 & 1 & 1 & 1 \\ 1 & 1 & 1 & 1 & 1 \\ 1 & 1 & 1 & 1 & 1 \end{pmatrix}$$

It is noted that stage 144(1) can include taking into account values of pixels that surround a search window but do not belong to the search window, and, additionally or alternatively, cloning pixels within the search window to virtually surround the boarder pixels of the search window and perform reconstruction based upon these virtually cloned pixels.

Stage 144(2) includes generating a gray level representation of a potential region of interest within each of the search windows of the second image. These potential regions of interest may be up-scaled (if the second image was a binned image or otherwise is characterized by a lower resolution than the reference image).

According to an embodiment of the invention stages 144(1) and 144(2) are followed by optional stage 144(3). Optional stage 144(3) includes compensating for fixed noise. The fixed noise represents differences between sensors (light sensitive elements) of the sensor array that generates the first and second images. Stage 144(3) includes subtracting a noise compensation matrix (referred to as Noise) from the gray level representation of a reference region of interest and subtracting the noise compensation matrix from the corresponding potential region of interest of the second image.

The noise compensation matrix is calculated by applying the low pass filter of stages 144(1) and 144(2) on a delta function matrix (Delta) that represents the standard deviation (STD) of the fixed noise, and performing an auto-correlation operation on the low pass filtered delta function. An exemplary matrix is illustrated below:

$$\text{Delta} = \begin{pmatrix} 0 & 0 & 0 & 0 & 0 \\ 0 & 0 & 0 & 0 & 0 \\ 0 & 0 & STD & 0 & 0 \\ 0 & 0 & 0 & 0 & 0 \\ 0 & 0 & 0 & 0 & 0 \end{pmatrix}, \text{Noise} = (L1 \times \text{Delta}) * (L1 \times \text{Delta}).$$

Stage 144(4) includes calculating a cross-correlation value between each gray level representation of a reference region of interest and the corresponding potential region of interest of the second image. This cross-correlation value can be a normalized value but this is not necessarily so.

Stage 144(4) is followed by altering the potential region of interest (selecting other points within the search windows) and jumping to stage 144(2). Stages 144(2)-144(4) are repeated until a predefined number of potential regions of interest per search window are compared (by cross-correlation) to the corresponding reference region of interest.

Stages 144(2)-144(4) are followed by stage 144(5) of selecting, per search window, a region of interest. Thus, at the conclusion of stage 144(5), N2 regions of interest within the second image are found. These regions of interest are characterized by higher cross-correlation values (per search window) out of the potential regions of interest.

It is noted that stage 144 generates a cross correlation matrix per search window. Thus, there are N2 correlation matrices $CC_1$-$CC_{N2}$. The values of the elements of the cross correlation matrix (CC) represent the cross-correlation between the reference region of interest and different potential regions of interest within the search window. The location of the elements within the cross correlation matrix represents the location (horizontal shift, vertical shift) of the potential region of interest within the search window. This location corresponds to the spatial shift of the potential region of interest in relation to the reference region of interest.

Stage 144 is followed by stage 150 of the shift between the reference window and the second window. The shift is responsive to the spatial relationships between the multiple reference regions of interest and between multiple corresponding regions of interest of the second image. Referring to the example set forth in FIG. 6, and assuming that new image 40 is a second acquired image, then shift 50 is responsive to seven spatial relationships (illustrated by a small arrows) between a reference region of interest 36(v) and a corresponding region of interest 46(v), wherein index v ranges between 1 and 7, and to five spatial relationships (illustrated by a small arrows) between a reference region of interest 38(w) and a corresponding region of interest 48(w), wherein index w ranges between 1 and 5.

Conveniently, the shift is responsive to similarity between the multiple spatial relationships. Conveniently, the similarity is responsive to locations of maximum valued elements within region of interest correlation matrices.

According to an embodiment of the invention stage 150 includes stages 150(1)-150(4). Stage 150(1) includes setting an initial weight to each cross-correlation matrix out of $CC_1$-$CC_{N2}$. The inventors used the same initial weight for each of cross-correlation matrix. $A\_init_1 = A\_init_2 = \ldots A\_init_{N2} = 1/64$.

Stage 150(1) is followed by stage 150(2) of calculating an aggregate cross-correlation matrix (ACC), using the initial weight:

$$ACC = \sum_i A init_i x CC_i$$

Stage 150(2) is followed by stage 150(3) of finding an intermediate maximum element (Inter_Max_element) within ACC. This element is characterized by a maximum element vertical shift (Inter_Max_element_y_shift) and a maximum element horizontal shift (Inter_Max_element_x_shift). It is assumed that this intermediate maximum element is the (Jmax_element, Kmax_element)$^{th}$ element of ACC.

Stage 150(3) is followed by stage 150(4) of updating the weight of each cross-correlation matrix by adding to the previous weight (which can be the initial weight) the (Jmax_element, Kmax_element)$^{th}$ element of that cross-correlation matrix (or the element that represents a vertical shift of (Inter_Max_element_y_shift) and a horizontal shift of (Inter_Max_element_x_shift). In mathematical terms:

$A_i$(updated)=$A$init$_i$+$CC_i$(Jmax_element, Kmax_element).

Stage 150(4) is followed by stage 150(5) of calculating an updated aggregate cross-correlation matrix (ACC_updated), using the updated weight:

$$ACC\_updated = \sum_i A_i(updated) x CC_i.$$

Stage 150(5) is followed by stage 150(6) of finding the maximum element (Max_element_updated) within the updated ACC. This element is characterized by a maximum element vertical shift (Max_element_y_shift) and a maximum element horizontal shift (Max_element_x_shift). It is assumed that this maximum element is the (Jmax_element, Kmax_element)$^{th}$ element of ACC.

Stage 150(6) is followed by stage 150(7) of defining the shift between the second image and the reference image as the spatial displacement represented by the maximum element: (Max_element_y_shift, Max_element_x_shift).

Stage 150(7) is followed by stage 150(8) of adding a spatially shifted (by the calculated shift—for example by (Max_element_y_shift, Max_element_x_shift)) second image to the reference image to generate an updated reference image. This stage may include up-scaling the spatially shifted second image.

Figure 5:
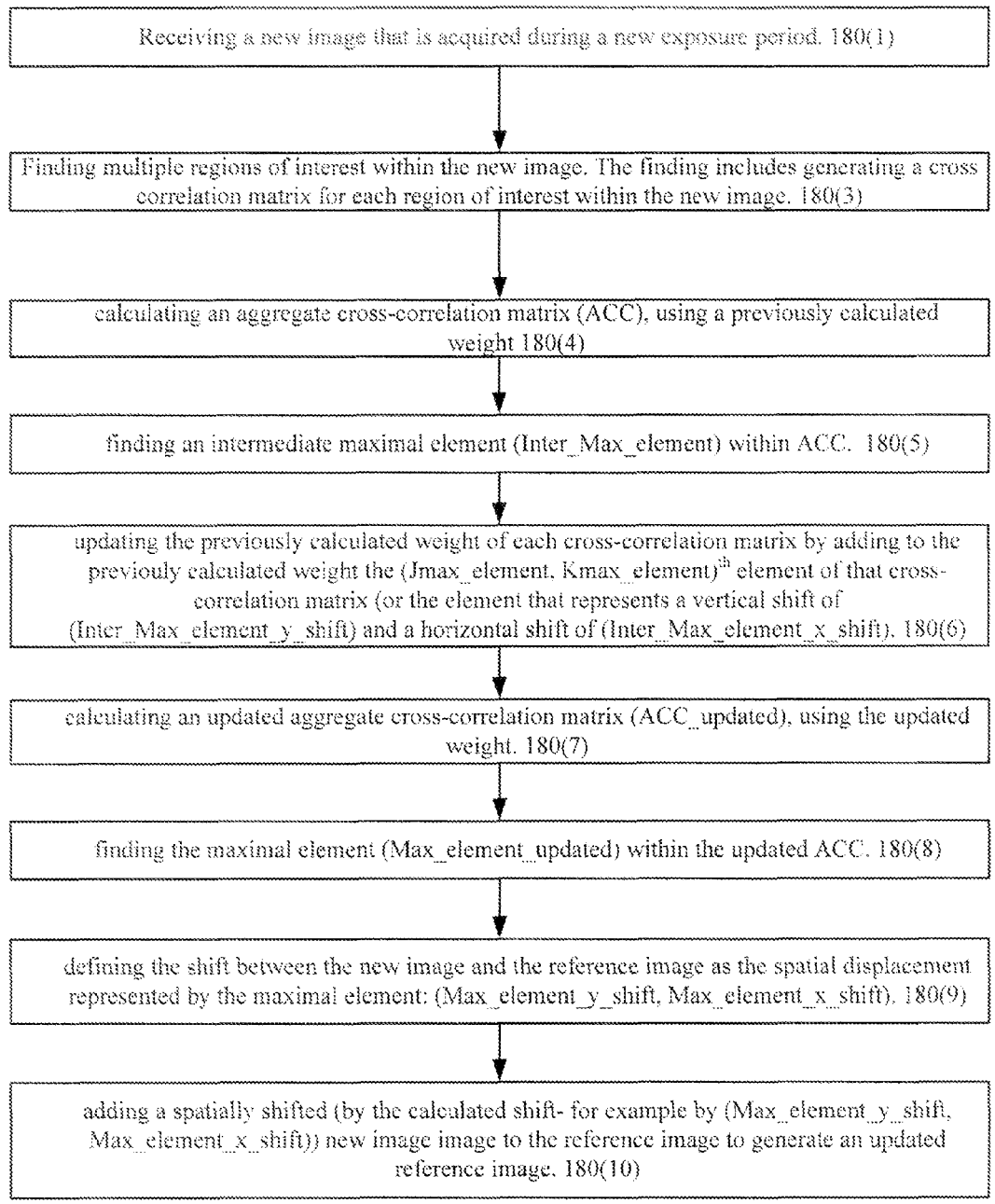
FIG. 5 illustrates a stage of receiving a new image and updating the reference image according to an embodiment of the invention.

FIG. 5 illustrates stage 180 of receiving a new image, and updating the reference image according to an embodiment of the invention. Assuming that an output image reflects the content of R acquired images than stage 180 is repeated (R-2) times.

Stage 180 starts by stage 180(1) of receiving a new image acquired during a new exposure period. During the first iteration of stage 180 the new image is the third image, while during the last iteration of stage 180 the new image is the R'th image.

Stage 180(1) is followed by stage 180(3) of finding multiple regions of interest within the new image. Stage 180(3) includes generating a cross correlation matrix for each regions of interest within the new image. Conveniently, stage 180(3) can includes stages 144(1)-144(5) that are applied on the new image (and not on the second image, as illustrated in FIG. 3).

Stage 180(3) is followed by stage 180(4) of calculating an aggregate cross-correlation matrix (ACC), using a previously calculated weight. This weight reflects the first iteration of stage 150 as well as the previous iterations of stage 180.

For simplicity of explanation, currently calculated values or matrices will be associated with index r while values or matrices calculated during the previous iteration of stage 180 (or during stage 150) are associated with index (r−1). In mathematical terms, stage 180(4) includes calculating the following equation:

$$ACC^{(r)} = \sum_i A_i^{(r-1)} x CC_i^r$$

Stage 180(4) is followed by stage 180(5) of finding an intermediate maximum element (Inter_Max_element) within ACC$^r$. This element is characterized by a maximum element vertical shift (Inter_Max_element_y_shift) and a maximum element horizontal shift (Inter_Max_element_x_shift). It is assumed that this intermediate maximum element is the (Jmax_element, Kmax_element)$^{th}$ element of ACC$^r$.

Stage 180(5) is followed by stage 180(6) of updating the weight of each cross-correlation matrix by adding to the previous weight (which can be the initial weight) the (Jmax_element, Kmax_element)$^{th}$ element of that cross-correlation matrix (or the element that represents a vertical shift of (Inter_Max_element_y_shift) and a horizontal shift of (Inter_Max_element_x_shift). In mathematical terms:

$$A_i^r = A_i^{r-1} + CC_i^r(J\text{max\_element}, K\text{max\_element})$$

Stage 180(6) is followed by stage 180(7) of calculating an updated aggregate cross-correlation matrix (ACC_updated)$^r$, using the updated weight:

$$\text{ACC\_updated}^r = \sum_i A_i^r x CC_i^r.$$

Stage 180(7) is followed by stage 180(8) of finding the maximum element (Max_element_updated) within the newly updated ACC. This element is characterized by a maximum element vertical shift (Max_element_y_shift) and a maximum element horizontal shift (Max_element_x_shift). It is assumed that this maximum element is the (Jmax_element, Kmax_element)$^{th}$ element of ACC.

Stage 180(8) is followed by stage 180(9) of defining the shift between the new image and the reference image as the spatial displacement represented by the maximal element: (Max_element_y_shift, Max_element_x_shift).

Stage 180(9) is followed by stage 180(10) of adding a spatially shifted (by the calculated shift; for example, by (Max_element_y_shift, Max_element_x_shift)) new image to the reference image to generate an updated reference image. This stage can include up-scaling the spatially shifted image, up-scaling the updated reference image and the like.

Figure 6:
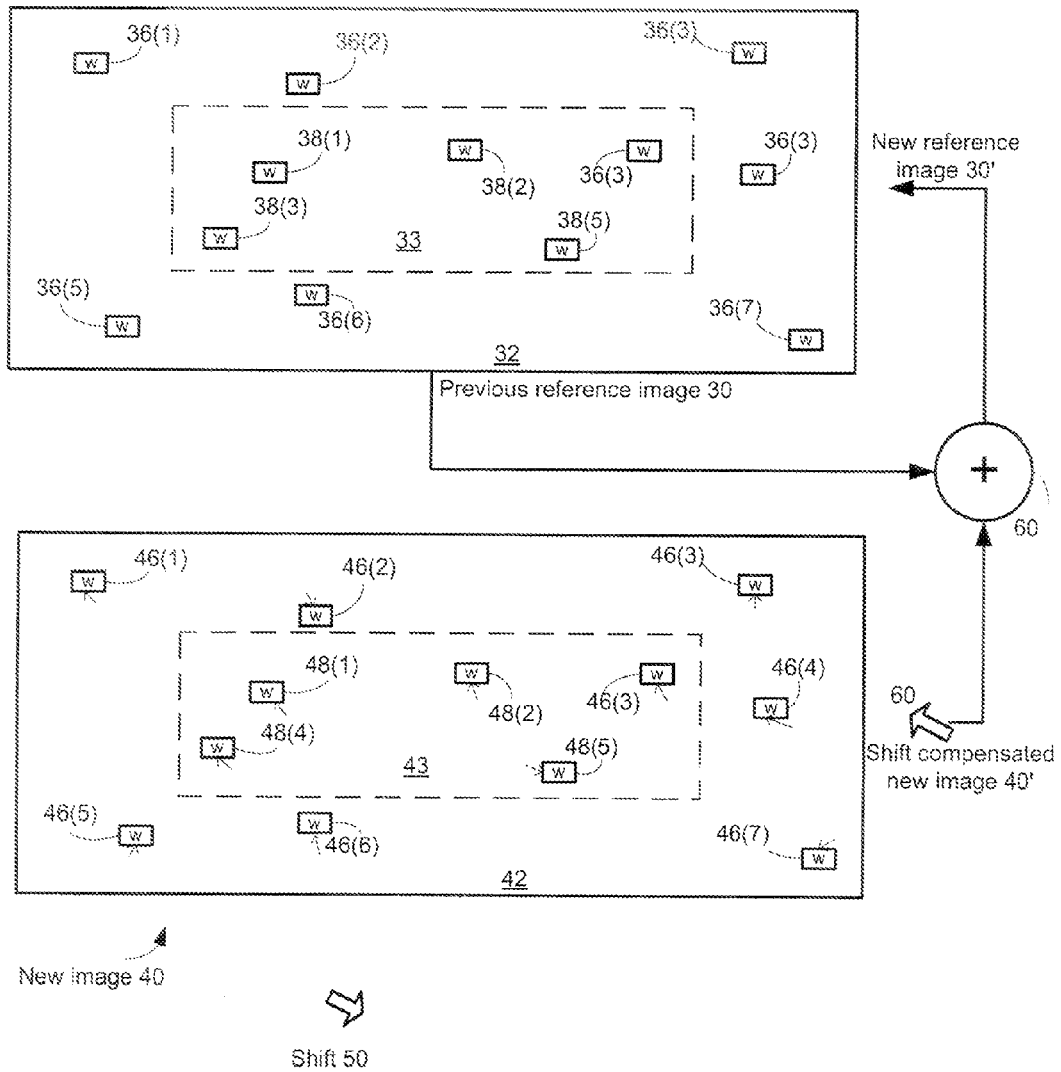
FIG. 6 illustrates an update of a reference image, according to an embodiment of the invention.

FIG. 6 illustrates an update of reference image 30, according to an embodiment of the invention.

Reference image 30 includes background portion 32 and foreground portion 33. Five regions of interest 38(1)-38(5) were defined in foreground portion 33 and seven regions of interest 36(1)-36(7) were defined in background portion 32. The regions of interest are spaced apart from each other.

FIG. 6 also illustrates a new image 40 that was acquired during a new exposure period. The new image can be the second to the R$^{th}$ acquired image. New image 40 includes background portion 42 and foreground portion 43. Five regions of interest 48(1)-48(5) were found in foreground portion 43 and seven regions of interest 36(1)-36(7) were found in background portion 42. The regions of interest are spaced apart from each other. These regions of interest can be found by executing stage 144 or 180(3). Each region of interest of new image 40 is connected to an arrow that represents the spatial relationship (relative shift) between that region of interest and the corresponding reference region of interest.

Arrow 50 represents the shift between new image 40 and reference image. This shift is calculated, for example, by applying stage 150 or stages 180(4)-180(8). Reference image 30 is then added (illustrated by adder 60) to a shift compensated (shift compensation illustrated by arrow 60) new image 40' to provide the new reference image 30'.

Figure 7:
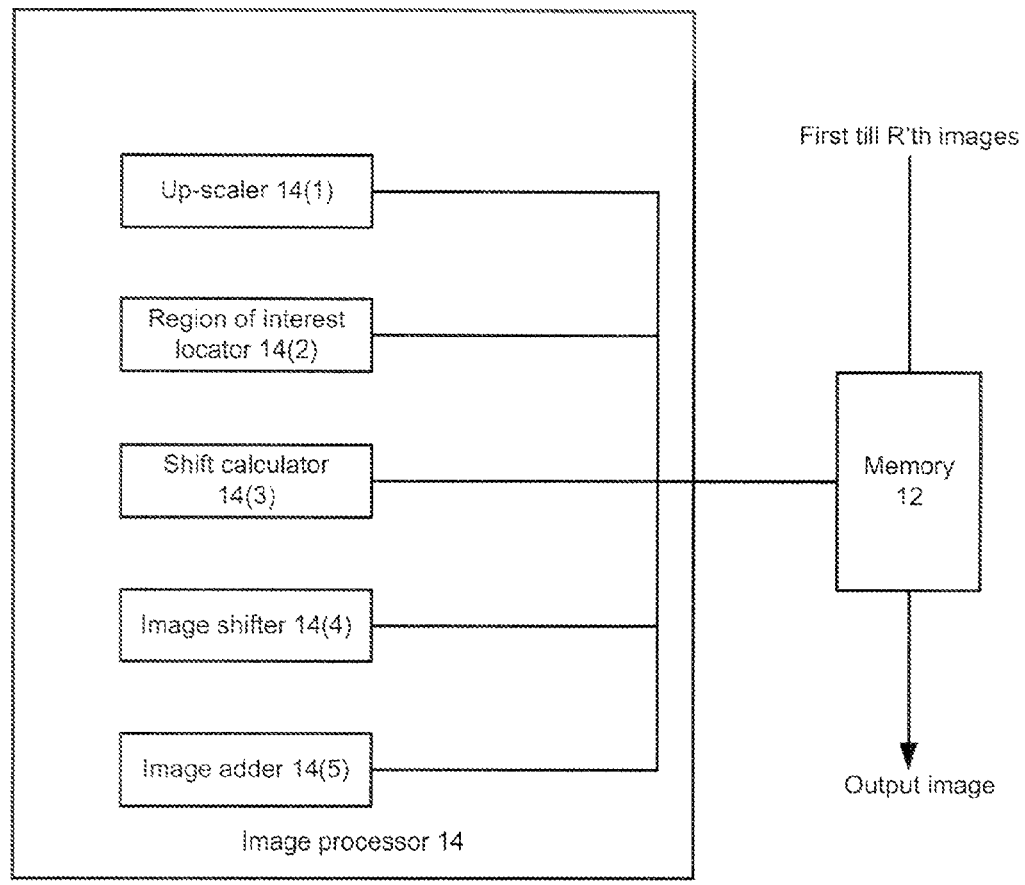
FIG. 7 illustrates an image generator configured according to an embodiment of the invention.

FIG. 7 illustrates image generator 10 configured according to an embodiment of the invention. Image generator 10 includes memory 12 and image processor 14. Memory 12 can include multiple queues, and can store multiple images. Memory 12 conveniently stores two images at a time—a newly acquired image and a reference image.

Image generator 10 can receive R images, process them and generate a single output image. R is a positive integer that is usually defined in view of the required dynamic range of the output image and the lighting conditions. Typically, dimmer environments can require more images (larger R). It is also noted that image generator 10 can include a sensor that acquires the images, and can also include a monitor for displaying the output image, although this is not necessarily so.

Image generator 10 starts to generate an image by receiving a first image and then receiving a second image. The first image is acquired during a first exposure period that is followed by a second exposure period during which the second image is acquired.

Image processor 14 is adapted to: (i) define a first image as a reference image; (ii) define multiple reference regions of interest within the reference image; wherein an aggregate number of pixels within the multiple reference regions of interest is substantially smaller than a number of pixels of the first image; and (iii) update the reference image in response to a content of a the reference image, a content of the second image and a first type of spatial relationship defined between the reference image and the second image; wherein the shift is defined in response to multiple spatial relationships between the multiple reference regions of interest and between multiple regions of interest of the second image. Image processor 14 can be a general purpose processor, a digital signal processor, can include hardware accelerators.

After the first and second images are acquired and an updated reference image is generated, image generator 10 can receive a third image that is acquired during a third exposure period. At the time of reception of that third image memory 12 can store the updated reference image and can also store the third image. It is noted that two or three images can be stored concurrently.

The image processor 14 is adapted to update the reference image in response to content of the third image, content of the reference image and an inter-image spatial relationship defined between the third image and the reference image. This update process can include executing stage 190 of method 100.

Image generator 10 can execute any stage of method 100. Conveniently, image generator 10 can perform each of the following (as well as a combination thereof): (i) define non-overlapping regions of interest; (ii) find multiple points of interest, wherein a point of interest is characterized by a high spatial derivative value and select multiple regions of interest, wherein a region of interest includes a point out of the group of points and wherein the selecting is responsive to at least one auto-correlation value of the region of interest; (iii) calculate multiple correlation values between a certain region of interest and multiple spatially shifted versions of the certain region of interest; (iv) calculate multiple spatial shifted versions wherein the spatial shift is responsive to a Bayer pattern of the first image; (v) ignore points of interest that are relatively proximate to each other; (vi) define at least one region of interest within a background portion of the reference image and defining at least one region of interest within a foreground portion of the reference image; (vii) generate a gray level representation of the multiple reference regions of interest, generate a gray level representation of the multiple regions of interest of the second image, and calculate the multiple spatial relationships between the multiple reference regions of interest and between multiple regions of interest of the second image in response to correlations between gray level representations of reference regions of interest and corresponding regions of interest of the second image; (viii) calculate the shift in response to similarity between the multiple spatial relationships, wherein the similarity can be responsive to locations of maximum valued elements within region of interest correlation matrices; (ix) calculate a fixed noise distribution and to update the reference image in response to the fixed noise distribution; and (x) up-scale the first image and the second image before updating the reference image.

For convenience of explanation various blocks of image processor 14 are shown. These blocks can be software blocks, hardware blocks or a combination of both. Image processor 14 includes up-scaler 14(1), region of interest locator 14(2), shift calculator 14(3), image shifter 14(4) and image adder 14(5). These blocks can be connected to each other as well as to memory 12, although other configurations can be used. Each block can internally store images or metadata relating to images. These images and the meta-data can be stored, additionally or alternatively, in memory 12.

Up-scaler 14(1) can up-scale an image. It can up-scale a new image before being spatially shifted and added to a (up-scaled) reference image. It can, for example, perform an up-scaling during various stages of the mentioned above method, including stages 150(8) and 180(10). Region of interest locator 14(2) can locate regions of interest within the first image (execute stage 120) and locate regions of interest in other images (execute stage 144, 180(3)).

Shift calculator 14(3) can calculate the shift between a new image and a reference image. It can execute stages 150 and 180(4)-180(9). Image shifter 14(4) can receive the shift from shift calculator 14(3) and shift the new image by that shift. Image adder 14(5) adds the shifter new image to the reference image to provide an updated reference image. Image shifter 14(4) and image adder 14(5) can execute stages 150(8) and 180(1).

It is noted that the highlighted blocks of image processor 140 can be controlled by a controller that is not shown for simplicity of explanation. It is further noted that the above-described method can be executed by a computer program that is embedded on a computer program product such as a disk, a diskette, a type and the like.

Although the invention has been described in conjunction with specific embodiments thereof, it is evident that many alternatives, modifications and variations will be apparent to those skilled in the art, accordingly, it is intended to embrace all such alternatives, modifications and variations that fall within the spirit and broad scope of the appended claims.

What is claimed is:

1. A reference image generator, comprising:
   a memory for storing a second image that is acquired during a second exposure period and a reference image; and
   an image processor, adapted to:
   (i) define a first image as a reference image, wherein the first image is acquired during a first exposure period that precedes the second exposure period;
   (ii) define multiple reference regions of interest within the reference image, wherein an aggregate number of pixels within the multiple reference regions of interest is substantially smaller than a number of pixels of the first image; and
   (iii) update the reference image in response to content of the reference image, content of the second image and a first type of spatial relationship defined between the reference image and the second image; wherein a shift is defined in response to multiple spatial relationships between the multiple reference regions of interest and between multiple regions of interest of the second image.

2. The image generator according to claim 1, wherein the memory is adapted to store a new image that is acquired during a new exposure period; and the image processor is adapted to update the reference image in response to content of the new image, content of the reference image and an inter-image spatial relationship defined between the new image and the reference image.

3. The image generator according to claim 1, wherein the image processor is adapted to define non-overlapping regions of interest.

4. The image generator according to claim 1, wherein the image processor is adapted to:
   find multiple points of interest, wherein a point of interest is characterized by a high spatial derivative value; and
   select multiple regions of interest, wherein a region of interest includes a point out of the group of points and wherein the selecting is responsive to at least one auto-correlation value of the region of interest.

5. The image generator according to claim 4, wherein the image processor is adapted to calculate multiple correlation values between a certain region of interest and multiple spatially shifted versions of the certain region of interest.

6. The image generator according to claim 5, wherein the image processor is adapted to calculate multiple spatial shifted versions wherein the spatial shift is responsive to a Bayer pattern of the first image.

7. The image generator according to claim 4, wherein the image processor is adapted to ignore points of interest that are relatively proximate to each other.

8. The image generator according to claim 1, wherein the image processor is adapted to define at least one region of interest within a background portion of the reference image and define at least one region of interest within a foreground portion of the reference image.

9. The image generator according to claim 1, wherein the image processor is adapted to:
   generate a gray level representation of the multiple reference regions of interest,
   generate a gray level representation of the multiple regions of interest of the second image; and
   calculate the multiple spatial relationships between the multiple reference regions of interest and between multiple regions of interest of the second image in response to correlations between gray level representations of reference regions of interest and corresponding regions of interest of the second image.

10. The image generator according to claim 9, wherein the image processor is adapted to calculate the shift in response to similarity between the multiple spatial relationships.

11. The image generator according to claim 9, wherein the similarity is responsive to locations of maximal valued elements within region of interest correlation matrices.

12. The image generator according to claim 1, wherein the image processor is adapted to further calculate a fixed noise distribution and to update the reference image in response to the fixed noise distribution.

13. The image generator according to claim 1, wherein the image processor is adapted to up-scale the first image and the second image before updating the reference image.

14. A computer program product of a non-transitory computer readable medium usable with a programmable computer, the computer program product having computer-readable code embodied therein for generating a reference image, the computer-readable code comprising instructions for:

receiving a first image that is acquired during a first exposure period and defining the first image as a reference image;

defining multiple reference regions of interest within the reference image, wherein an aggregate number of pixels within the multiple reference regions of interest is substantially smaller than a number of pixels of the first image;

receiving a second image that is acquired during a second exposure period; and updating the reference image in response to a content of the reference image, content of the second image and a first type of spatial relationship defined between the reference image and the second image, wherein a shift is defined in response to multiple spatial relationships between the multiple reference regions of interest and between multiple regions of interest of the second image.

15. The computer program product of claim 14, wherein the instructions for generating an image comprise instructions for receiving a new image that is acquired during a new exposure period; and updating the reference image in response to content of the new image, content of the reference image and a further shift between the new image and the reference image.

* * * * *